US011021386B2

(12) United States Patent
Barnett et al.

(10) Patent No.: US 11,021,386 B2
(45) Date of Patent: Jun. 1, 2021

(54) GLASS MANUFACTURING APPARATUSES AND METHODS FOR OPERATING THE SAME

(71) Applicant: Corning Incorporated, Corning, NY (US)

(72) Inventors: Brad Steven Barnett, Harrodsburg, KY (US); Brian Douglas Burns, Harrodsburg, KY (US); Timothy Joseph Helmers, Danville, KY (US); Andrea Ha Oac, Lawrenceburg, KY (US); Kimberly Denise Smith, Harrodsburg, KY (US)

(73) Assignee: Corning Incorporated, Corning, NY (US)

( * ) Notice: Subject to any disclaimer, the term of this patent is extended or adjusted under 35 U.S.C. 154(b) by 114 days.

(21) Appl. No.: 16/188,847

(22) Filed: Nov. 13, 2018

(65) Prior Publication Data

US 2019/0077689 A1  Mar. 14, 2019

Related U.S. Application Data

(62) Division of application No. 14/848,800, filed on Sep. 9, 2015, now abandoned.

(51) Int. Cl.
*C03B 5/24* (2006.01)
*C03B 7/07* (2006.01)
(Continued)

(52) U.S. Cl.
CPC .................. *C03B 5/24* (2013.01); *C03B 5/43* (2013.01); *C03B 7/005* (2013.01); *C03B 7/07* (2013.01)

(58) Field of Classification Search
CPC .. C03B 5/24; C03B 5/37; C03B 7/005; C03B 7/07
See application file for complete search history.

(56) References Cited

U.S. PATENT DOCUMENTS 4,365,986 A  12/1982  Nayak
4,726,831 A  2/1988  Fogle et al.
(Continued)

FOREIGN PATENT DOCUMENTS

JP  11-240725 A  9/1999
JP  2014051399 A  3/2014
(Continued)

OTHER PUBLICATIONS

International Search Report and Written Opinion PCT/US2016/050659 dated Dec. 23, 2016.

*Primary Examiner* — Queenie S Dehghan
(74) *Attorney, Agent, or Firm* — Matthew B. McNutt; Ryan T. Hardee

(57) ABSTRACT

In embodiments, a method for operating a glass manufacturing apparatus may include heating a delivery conduit with resistive windings positioned around an exterior surface of the delivery conduit, the delivery conduit extending between a mixing vessel and a delivery vessel. The method may also include injecting electric current through the delivery conduit while heating the delivery conduit with resistive windings and prior to flowing molten glass through the delivery conduit thereby increasing a temperature of the of the delivery conduit, wherein an input heat flux into the delivery conduit is greater than an output heat flux away from the delivery conduit prior to flowing molten glass through the delivery conduit.

17 Claims, 3 Drawing Sheets

(51) Int. Cl.
   *C03B 5/43*   (2006.01)
   *C03B 7/00*   (2006.01)

(56) References Cited

U.S. PATENT DOCUMENTS

| | | | |
|---|---|---|---|
| 5,344,531 A * | 9/1994 | Saito | B08B 17/00 |
| | | | 204/196.05 |
| 6,076,375 A | 6/2000 | Dembicki et al. | |
| 7,013,677 B2 | 3/2006 | Singer | |
| 7,283,227 B2 | 10/2007 | Dureiko | |
| 7,454,925 B2 | 11/2008 | Deangelis et al. | |
| 8,269,131 B2 | 9/2012 | Adelsberg et al. | |
| 8,274,018 B2 | 9/2012 | De Angelis et al. | |
| 8,661,852 B2 | 3/2014 | Leister et al. | |
| 8,695,378 B2 | 4/2014 | Thomas | |
| 8,713,971 B2 | 5/2014 | Tivey et al. | |
| 8,796,579 B2 | 8/2014 | Adelsberg et al. | |
| 8,857,219 B2 | 10/2014 | De Angelis et al. | |
| 2006/0016219 A1 * | 1/2006 | Pitbladdo | G01F 1/6888 |
| | | | 65/29.21 |
| 2008/0083250 A1 | 4/2008 | Nagno et al. | |
| 2008/0092597 A1 | 4/2008 | Itoh et al. | |
| 2010/0199721 A1 | 8/2010 | Antoine et al. | |
| 2014/0013806 A1 * | 1/2014 | De Angelis | C03B 7/098 |
| | | | 65/135.1 |
| 2018/0072602 A1 * | 3/2018 | De Angelis | C03B 7/098 |

FOREIGN PATENT DOCUMENTS

| | | |
|---|---|---|
| JP | 2014-198656 A | 10/2014 |
| WO | 2014119709 A1 | 8/2014 |

* cited by examiner

GLASS MANUFACTURING APPARATUSES AND METHODS FOR OPERATING THE SAME

CROSS REFERENCE TO RELATED APPLICATIONS

The present application is a divisional of U.S. patent application Ser. No. 14/848,800 filed Sep. 9, 2015 and entitled "Glass Manufacturing Apparatuses And Methods For Operating The Same," the entirety of which is incorporated by reference herein.

BACKGROUND

Field

The present specification generally relates to glass manufacturing apparatuses and, more specifically, to methods and apparatuses for heating portions of glass manufacturing apparatuses.

Technical Background

In glass manufacturing processes, molten glass is passed through a series of processing and conditioning stages prior to forming the molten glass into a finished form (e.g., sheets, ribbons, cylinders, etc.). These processing and conditioning stages may be interconnected with a series of tubes or conduits formed from refractory metals. Each process and/or conditioning stage may require that the glass be maintained within a specific temperature range for that particular process. As these temperature ranges may not be co-extensive, it may be necessary to control the heat flux through the various processing and conditioning stages to obtain glass with the desired properties.

Accordingly, a need exists for alternative apparatuses and methods suitable for heating portions of glass manufacturing apparatuses.

SUMMARY

According to one embodiment, a method for operating a glass manufacturing apparatus may include heating a delivery conduit with resistive windings positioned around an exterior surface of the delivery conduit, the delivery conduit extending between a mixing vessel and a delivery vessel. The method may also include injecting electric current through the delivery conduit while heating the delivery conduit with resistive windings and prior to flowing molten glass through the delivery conduit thereby increasing a temperature of the delivery conduit, wherein an input heat flux into the delivery conduit is greater than an output heat flux away from the delivery conduit prior to flowing molten glass through the delivery conduit.

In another embodiment, a glass manufacturing apparatus may include a mixing vessel comprising an upstream electrode and a delivery vessel comprising a downstream electrode. A delivery conduit may connect the mixing vessel to the delivery vessel. The delivery conduit may include resistive windings positioned around an exterior surface of the delivery conduit. A first power source may be electrically coupled to the resistive windings. A second power source may be electrically coupled to the upstream electrode, the downstream electrode, and the delivery conduit in a closed-loop circuit. An electronic control unit may be communicatively coupled to the first power source and the second power source. The electronic control unit may include a memory and a computer readable and executable instruction set. When executed by the processor, the computer readable and executable instruction set may be operable to: actuate the first power source thereby heating the delivery conduit with the resistive windings; and, prior to flowing molten glass through the delivery conduit, actuate the second power source thereby injecting electric current through the delivery conduit while heating the delivery conduit with the resistive windings and increasing a temperature of the delivery conduit such that an input heat flux into the delivery conduit is greater than an output heat flux away from the delivery conduit prior to flowing molten glass through the delivery conduit.

Additional features and advantages of the glass manufacturing apparatus and methods for operating the same described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
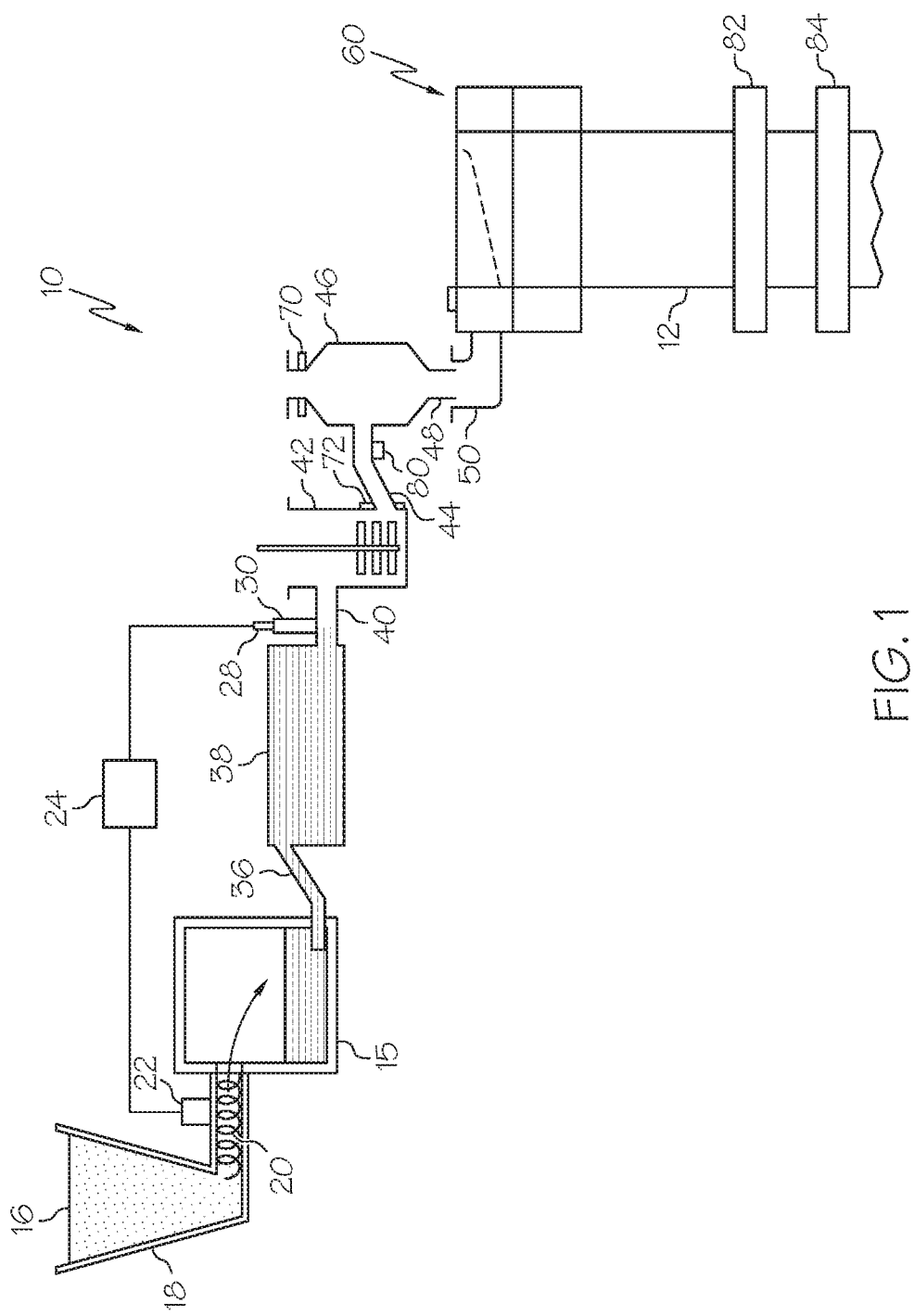
FIG. 1 schematically depicts a glass manufacturing apparatus according to one or more embodiments shown and described herein.

Reference will now be made in detail to embodiments of glass manufacturing apparatuses and methods for operating the same, examples of which are illustrated in the accompanying drawings. Whenever possible, the same reference numerals will be used throughout the drawings to refer to the same or like parts. According to one embodiment, a method for operating a glass manufacturing apparatus may include heating a delivery conduit with resistive windings positioned around an exterior surface of the delivery conduit, the delivery conduit extending between a mixing vessel and a delivery vessel. The method may also include injecting an electric current through the delivery conduit while heating the delivery conduit with resistive windings and prior to flowing molten glass through the delivery conduit thereby increasing a temperature of the delivery conduit, wherein an input heat flux into the delivery conduit is greater than an output heat flux away from the delivery conduit prior to flowing molten glass through the delivery conduit. Embodiments of glass manufacturing apparatuses and methods for operating the same are described in further detail herein with specific reference to the appended drawings.

As noted herein, molten glass may be conveyed between successive stages of a glass manufacturing apparatus using tubes or conduits formed from refractory metals. These tubes or conduits may be constructed to be thermally "lossy." That is, the tubes or conduits may be constructed to dissipate heat from the tube or conduit which, in turn, allows for improved control of the temperature of the molten glass flowing through the tube or conduit. Specifically, successive stages of a glass manufacturing apparatus may require that the molten glass be within a certain temperature regime to effectuate the processing occurring in that stage or a downstream stage of the glass manufacturing apparatus. In the event that a downstream stage of the glass manufacturing apparatus requires a lower temperature regime than an upstream stage of the glass manufacturing apparatus, heat will have to be extracted from the molten glass as it flows from the upstream stage to the downstream stage. In the present context, the molten glass flows from upstream to downstream and, as such, the adjectives "upstream" and "downstream" refer to the relative orientation and/or timing of a process or a component in the glass manufacturing apparatus. For example, molten glass will flow through an "upstream" component or process before the molten glass flows through a "downstream" component.

When an upstream stage has a greater temperature regime than needed in the next consecutive downstream stage, a well insulated (thermally efficient) tube or conduit is unsuitable for connecting the upstream stage with the downstream stage as the well-insulated tube or conduit will prevent the removal of heat from the molten glass. Accordingly, the tubes or conduits, including for example surrounding insulating material, can be constructed to dissipate heat from the tube or conduit to assist in extracting heat from the molten glass. However, while a thermally "lossy" tube or conduit will aid in extracting heat from the molten glass, such tubes or conduits do not offer sufficient control of the temperature of the molten glass. To address this, the tube or conduit may be provided with heating elements, such as resistive windings positioned about the tube or conduit, which can be used to indirectly heat the tube or conduit, thereby improving control of the temperature of the molten glass as the molten glass is flowing through the tube or conduit.

While glass manufacturing apparatuses constructed with tubes or conduits as described above may be effective for controlling the temperature of molten glass during operation of the apparatus, they introduce a significant impediment to heating the glass manufacturing apparatus prior to flowing molten glass through the apparatus. Specifically, portions of the glass manufacturing apparatus are pre-heated prior to flowing molten glass through the glass manufacturing apparatus in order to achieve a desired flow upon start-up. However, the thermally "lossy" tubes or conduits may be too efficient at removing heat from the tube or conduit and, as a result, the heating elements may be unable to heat the tubes or conduits to the required operating temperatures when the tubes or conduits are free (or substantially free) of molten glass. That is, the tubes or conduits effectively dissipate the heat from the resistive windings faster than the heat can be introduced into the tubes or conduits by those windings. The embodiments described herein are directed to mitigating the heating problems encountered during the start-up of a glass manufacturing apparatus.

Referring now to FIG. 1, one embodiment of a glass manufacturing apparatus 10 for making glass, such as a glass ribbon 12, is schematically depicted. The glass manufacturing apparatus 10 generally includes a melting vessel 15 configured to receive batch material 16 from a storage bin 18. The batch material 16 can be introduced to the melting vessel 15 by a batch delivery device 20 powered by a motor 22. An optional controller 24 may be provided to activate the motor 22 and a molten glass level probe 28 can be used to measure the glass melt level within a standpipe 30 and communicate the measured information to the controller 24.

The glass manufacturing apparatus 10 can also include a fining vessel 38, such as a fining tube, located downstream from the melting vessel 15 and coupled to the melting vessel 15 by way of a first connecting tube 36. A mixing vessel 42 is located downstream from the fining vessel 38. A delivery vessel 46 is located downstream from the mixing vessel 42. As depicted, a second connecting tube 40 couples the fining vessel 38 to the mixing vessel 42. A delivery conduit 44 couples the mixing vessel 42 to the delivery vessel 46. As further illustrated, a downcomer 48 is positioned to deliver glass melt from the delivery vessel 46 to an inlet 50 of a forming apparatus 60. In the embodiments shown and described herein, the forming apparatus 60 can be a fusion-forming vessel which may also be referred to as an isopipe. While the forming apparatus 60 is depicted in FIG. 1 as a fusion-forming vessel, it should be understood that, in other embodiments, the forming apparatus 60 may be a slot-draw apparatus or another apparatus suitable for forming molten glass into a glass ribbon 12 or another configuration, including, without limitation, a glass tube.

The melting vessel 15 is typically made from a refractory material, such as refractory (e.g., ceramic) brick. The glass manufacturing apparatus 10 may further include components that are typically made from electrically conductive refractory metals such as, for example, platinum or platinum-containing metals such as platinum-rhodium, platinum-iridium and combinations thereof. Such refractory metals may also include molybdenum, palladium, rhenium, tantalum, titanium, tungsten, ruthenium, osmium, zirconium, and alloys thereof and/or zirconium dioxide. The platinum-containing components can include one or more of the first connecting tube 36, the fining vessel 38, the second connecting tube 40, the standpipe 30, the mixing vessel 42, the delivery conduit 44, the delivery vessel 46, the downcomer 48 and the inlet 50. In embodiments, the forming apparatus 60 can also be made from a refractory material, including the foregoing refractory ceramic material and refractory metals.

Figure 2:
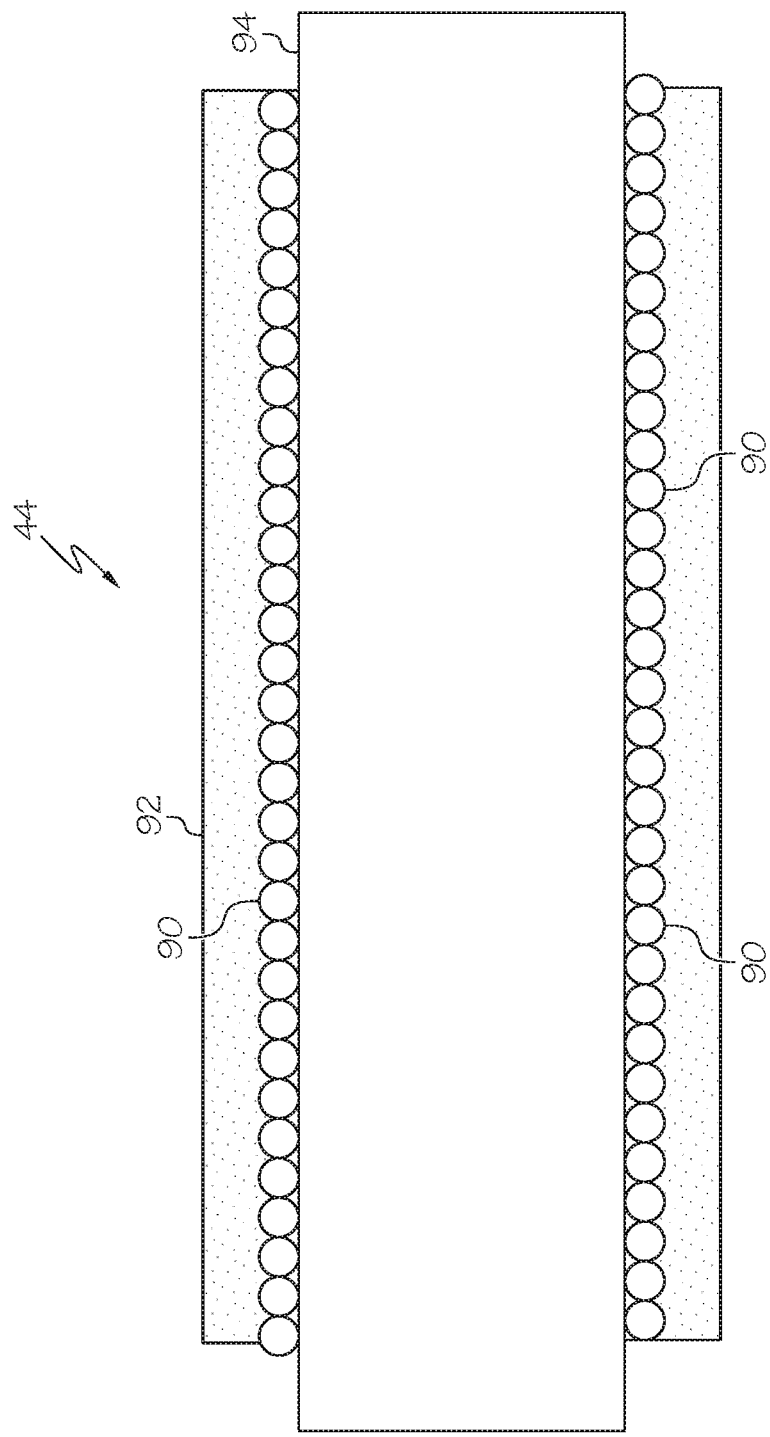
FIG. 2 schematically depicts a cross section of a delivery conduit of the glass manufacturing apparatus of FIG. 1 according to one or more embodiments shown and described herein.

Referring now to FIGS. 1 and 2, a cross section of at least a portion of the delivery conduit 44 is schematically depicted in FIG. 2. In embodiments, the delivery conduit 44 may include a plurality of resistive windings 90 disposed around the external surface 94 of the delivery conduit 44. The resistive windings 90 may be formed from, for example, molybdenum disilicide, platinum, platinum-rhodium, iron-chromium-aluminum alloys such as Kanthal Al, Kanthal APM (a ferritic iron-chromium-aluminum alloy), or any other material suitable for forming a high-temperature heating element. The resistive windings 90 may be coupled to a first power source (not shown in FIGS. 1 and 2) which supplies electric current to the resistive windings 90, resistively heating the resistive windings 90 and indirectly heating the delivery conduit 44 via conduction and/or radiation.

Still referring to FIGS. 1 and 2, the delivery conduit 44 may further comprise an insulating refractory material 92 positioned around the resistive windings 90. The insulating refractory material 92 may be a high heat loss refractory material which allows heat to dissipate from the resistive windings 90 and/or the external surface 94 of the delivery conduit 44 such that the delivery conduit 44 is thermally lossy, as noted above. In embodiments, the insulating refractory material 92 may be for example, Mono A2 or Mono M refractory materials manufactured by RHI-Monofrax, Tamax or Gem refractory materials manufactured by Narco, Scimos A or Scimos CZ refractory materials manufactured by SGTMKK. Thus, it should be understood that the resistive windings 90 may be used to indirectly heat the delivery conduit 44 and that the insulating refractory material 92 provides some degree of insulation to the conduit while allowing heat to readily escape from the delivery conduit 44.

Referring again to FIG. 1, the glass manufacturing apparatus 10 may further include a downstream electrode 70 electrically coupled to a downstream end of the delivery conduit 44 or, alternatively, to an electrically conductive component positioned downstream of the delivery conduit 44 and which is electrically coupled to the delivery conduit 44. For example, in embodiments, the downstream electrode 70 may be coupled to a standpipe atop the delivery vessel 46, as depicted in FIG. 1, which, in turn, is electrically coupled to the delivery conduit 44. In addition, the glass manufacturing apparatus 10 may also include an upstream electrode 72 electrically coupled to an upstream end of the delivery conduit 44 or, alternatively, to an electrically conductive component upstream of the delivery conduit 44 and which is electrically coupled to the delivery conduit 44. For example, in embodiments, the upstream electrode 72 may be coupled to the lower end of the mixing vessel 42 proximate an outlet of the mixing vessel and/or electrically coupled to the delivery conduit 44.

The downstream electrode 70 and the upstream electrode 72 may be formed from electrically conductive refractory metals such as, for example, platinum or platinum-containing metals including platinum-rhodium, platinum-iridium and combinations thereof, as described above. The location of the downstream electrode 70 and the upstream electrode 72 at either end of the delivery conduit 44 facilitate injecting electric current into, and passing electric current through, the delivery conduit 44, thereby directly heating the delivery conduit 44 by resistive heating and, in turn, heating the contents of the delivery conduit 44 (i.e., molten glass) when such contents are present in the delivery conduit 44. For example, in embodiments, a second power source (not shown in FIG. 1) may be electrically coupled to the downstream electrode 70 and the upstream electrode 72 such that the upstream electrode 72, the downstream electrode 70, the delivery conduit 44, and the second power source form a closed-loop circuit. In the embodiments described herein, the second power source P2 is electrically coupled to the downstream electrode 70 such that current is injected into the closed-loop circuit through the downstream electrode 70. However, it should be understood that, in alternative embodiments, electric current may be injected through the upstream electrode 72. The electric current supplied to the delivery conduit 44 with the second power source P2 directly heats the delivery conduit 44 via resistive heating. This direct heating of the delivery conduit 44 via resistive heating may be performed in addition to any indirect heating of the delivery conduct such as, for example, with the resistive windings 90 described above.

While FIGS. 1 and 2 depict the delivery conduit 44 of the glass manufacturing apparatus 10 as being constructed to facilitate both direct and indirect heating, it should be understood that the first connecting tube 36 and the second connecting tube 40 may be similarly constructed (i.e., with resistive windings, refractory insulation, and electrodes located proximate to either end) to facilitate control of the temperature of the connecting tubes 36, 40, and/or the molten glass flowing therethrough, by a combination of direct and indirect heating. For example, in embodiments, the second connecting tube 40 may include resistive windings and refractory insulation, as described with respect to FIG. 2. In addition, the second connecting tube 40 may be electrically coupled to an upstream electrode positioned on or adjacent to the fining vessel 38 and electrically coupled to a downstream electrode positioned on or adjacent to the mixing vessel 42. A similar configuration may be used for the first connecting tube located between the melting vessel 15 and the fining vessel 38. One or more thermocouples may also be operatively associated with each of the first connecting tube 36 and the second connecting tube 40 for detecting a temperature of the respective tubes. In embodiments where the first and second connecting tubes 36, 40 are constructed in a similar manner as the delivery conduit 44, similar control techniques, as described in further detail herein with respect to the delivery conduit 44, may be used to control the temperature of the first connecting tube 36 and the second connecting tube 40.

In embodiments, the glass manufacturing apparatus 10 may further include one or more thermocouples 80 (one depicted in FIG. 1) operatively associated with the delivery conduit 44. The one or more thermocouples 80 may be utilized to monitor a temperature of the delivery conduit 44 and the contents of the delivery conduit 44 (i.e., molten glass) when such contents are present in the delivery conduit 44.

In some embodiments, the glass manufacturing apparatus 10 may optionally include a flaw detection system (FDS) 84 and/or a flow rate monitor (FRM) 82. The flaw detection system 84 may be positioned downstream of the forming apparatus 60 such that the flaw detection system 84 is able to detect flaws, such as inclusions, onclusions, seeds (i.e., gas bubbles), voids, cord, striations, scratches, blisters or other imperfections associated with a discontinuity or material non-homogeneity present in the glass ribbon 12 formed by the forming apparatus 60. The flaw detection system 84 may include any optical and/or acoustic detection system suitable for detecting a flaw in the glass ribbon. One suitable flaw detection system 84is described in U.S. Pat. No. 7,283,227 entitled "Oblique Transmission Illumination Inspection System And Method For Inspecting Glass Sheet" and assigned to Corning Incorporated, however it should be understood that other flaw detection systems for use with the glass manufacturing systems and methods described herein are contemplated and possible.

The flow rate monitor 82, when included, may be positioned downstream of the forming apparatus 60 such that the flow rate monitor 82 is able to detect a rate at which the glass ribbon is drawn from the forming apparatus 60. The flow rate monitor 82 may use, for example, non-contact, optical detectors and/or mechanical rollers to determine the rate at which glass is drawn from the forming apparatus 60 and, based on the draw rate, dimensions of the glass ribbon (i.e., the width and thickness), and approximate density of the solidified glass, determine a flow rate of molten glass through the glass manufacturing apparatus 10 in kilograms (or pounds) per unit of time. In other embodiments, the flow rate monitor may include a scale for measuring a weight of the glass ribbon drawn from the forming vessel per specified period of time which, in turn, directly correlates to the flow rate of molten glass through the glass manufacturing apparatus 10.

Figure 3:
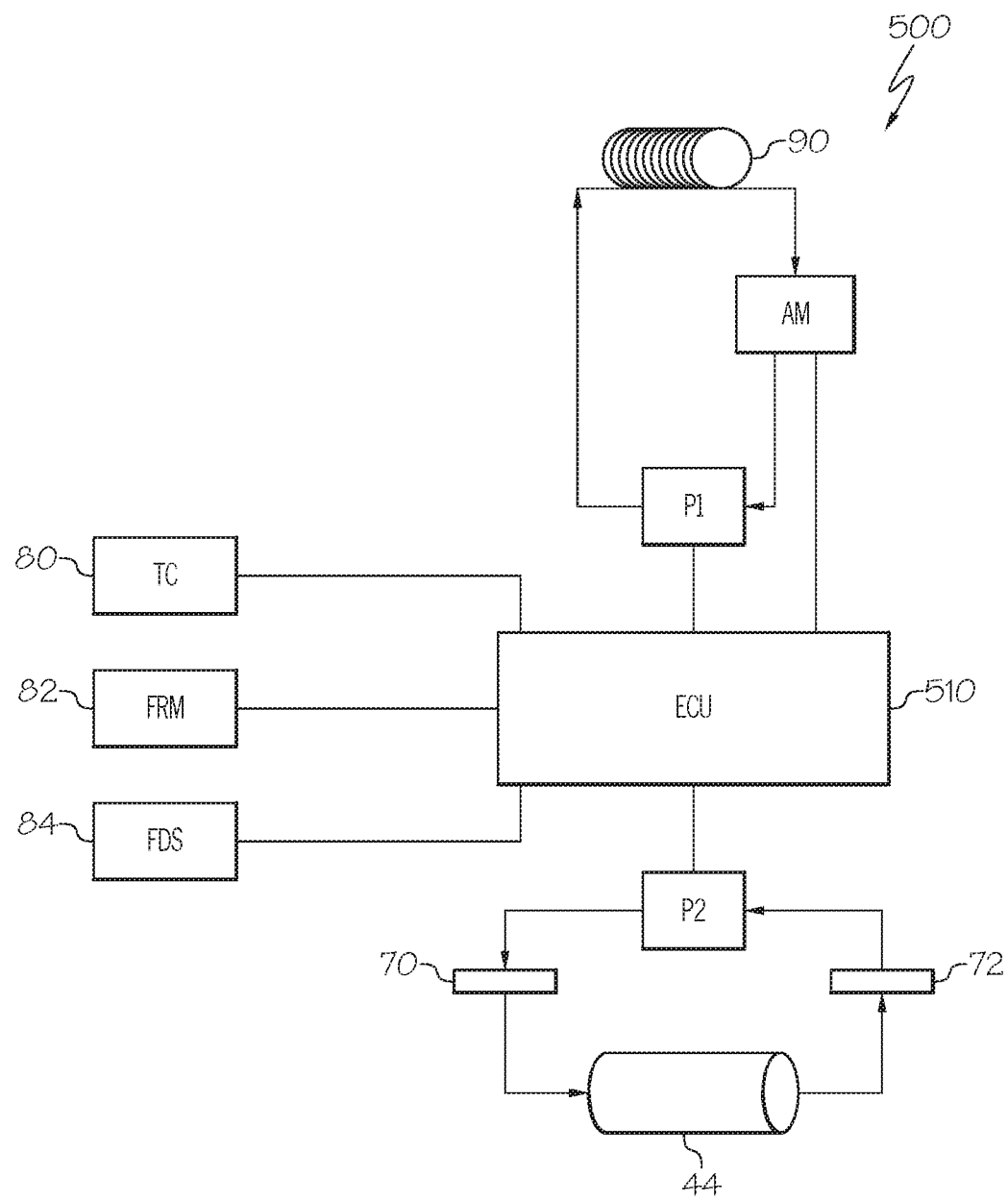
FIG. 3 schematically depicts the interconnectivity of various electrical components of the glass manufacturing apparatus of FIG. 1.

Referring now to FIG. 3, a control system 500 for the glass manufacturing apparatus of FIGS. 1 and 2 is schematically depicted showing the interconnectivity of the various electrical components of the glass manufacturing apparatus 10. As shown in FIG. 3, the control system 500 generally includes an electronic control unit (ECU) 510. The ECU 510 may include a processor (not shown) and a non-transitory memory (not shown) which includes computer readable and executable instructions which, when executed by the processor, facilitates the operation of the glass manufacturing apparatus 10 and, in particular, automated control of the temperature of the delivery conduit 44 and the contents of the delivery conduit 44 (i.e., molten glass) when such contents are present in the delivery conduit 44. The ECU 510 is communicatively coupled to the first power source P1 which supplies electric current to the resistive windings 90 positioned around an exterior surface of the delivery conduit 44. The ECU 510 actuates (i.e., switches on and off) the first power source P1 and regulates the flow of electric current from the first power source P1 to the resistive windings 90 with control signals sent to the first power source P1, thereby controlling the indirect heating of the delivery conduit 44 by the resistive windings 90.

In embodiments, the control system 500 may also include at least one ammeter AM electrically coupled to the resistive windings 90 and communicatively coupled to the ECU 510. The ammeter AM detects electric current passing through the resistive windings 90 and provides the ECU 510 with a signal indicative of the magnitude of electric current passing through the resistive windings. This signal may be used by the ECU 510 to control the direct heating of the delivery conduit 44 by injecting electric current into the delivery conduit 44. For example, a drop in electric current through the resistive windings 90 may be indicative of a malfunction and/or failure in the windings and a corresponding loss of heat input into the delivery conduit. If the ECU 510 detects that the electric current through the resistive windings 90 is less than a threshold electric current value based on the signal received from the ammeter AM, the ECU 510 supplements the indirect heating of the delivery conduit 44 by the resistive windings 90 by directly heating the delivery conduit 44, as described in greater detail herein.

The ECU 510 is also communicatively coupled to the second power source P2 which injects electric current into the delivery conduit 44 through the downstream electrode 70 and/or the upstream electrode 72. That is, the second power source P2 is electrically coupled to the upstream electrode 72, the downstream electrode 70, and the delivery conduit 44 in a closed-loop circuit. The ECU 510 actuates (i.e., switches on and off) the second power source P2 and regulates the flow of electric current from the second power source P2 through the downstream electrode 70, the delivery conduit 44, and the upstream electrode 72 with control signals sent to the second power source P2, thereby controlling the direct heating of the delivery conduit 44.

Still referring to FIG. 3, the one or more thermocouples 80 (when included) are communicatively coupled to the ECU 510. The thermocouple 80 detects the temperature of the delivery conduit 44 and provides the ECU 510 with a signal indicative of the temperature of the delivery conduit 44. This signal may be used by the ECU 510 to control both the direct heating (by power source P1 and windings 90) and indirect heating (by power source P2 and electrodes 70, 72) of the delivery conduit 44, as will be described in further detail herein. For example, in some embodiments, when the temperature of the delivery conduit 44 is below a threshold temperature, as determined by the ECU 510 based on the signal received from the thermocouple 80, the ECU 510 increases the temperature of the delivery conduit 44 by directly heating the delivery conduit, as will be described in further detail herein.

The flaw detection system 84 (when included) is communicatively coupled to the ECU 510. The flaw detection system 84 may be used to detect the presence of flaws in the glass ribbon formed by the glass manufacturing apparatus 10. When flaws in the glass ribbon are detected, the flaw detection system 84 provides the ECU 510 with a signal indicative of the presence of flaws. This signal may be used by the ECU 510 to control the indirect and/or direct heating of the delivery conduit 44 to reduce the occurrence of flaws in the glass ribbon. For example, in some embodiments, when flaws are detected in the glass ribbon as determined by the ECU 510 based on the signal received from the flaw detection system 84, the ECU 510 increases the temperature of the delivery conduit 44 by directly heating the delivery conduit, mitigating the occurrence of flaws, as will be described in further detail herein.

The flow rate monitor 82 (when included) is communicatively coupled to the ECU 510. The flow rate monitor 82 may be used to determine the flow rate of molten glass through the glass manufacturing apparatus 10. The flow rate monitor 82 provides the ECU 510 with a signal indicative of the flow rate of molten glass through glass manufacturing apparatus 10. This signal may be used by the ECU 510 to control the indirect and/or direct heating of the delivery conduit 44 to increase the flow rate of molten glass through the glass manufacturing apparatus. For example, in some embodiments, when the flow rate of molten glass through the glass manufacturing apparatus 10 is less than a baseline flow rate, as determined by the ECU 510 based on the signal received from the flow rate monitor 82, the ECU 510 increases the temperature of the delivery conduit 44 by directly heating the delivery conduit, thereby increasing the flow rate of molten glass through the glass manufacturing apparatus 10, as will be described in further detail herein.

Methods of operating glass manufacturing apparatuses will now be described with specific detail to FIGS. 1 and 3.

In embodiments, glass manufacturing apparatuses 10 as shown in FIG. 1 may undergo an initial start-up in which portions of the glass manufacturing apparatus 10 may be pre-heated to a certain temperature prior to flowing molten glass through the glass manufacturing apparatus 10. For example, during start-up of the glass manufacturing apparatus, the delivery conduit 44 may be substantially free of molten glass. That is, molten glass is not flowing through the delivery conduit 44 from the mixing vessel 42 to the delivery vessel 46. However, the delivery conduit 44 may be preheated in order to increase the temperature of the delivery conduit 44 to ensure the proper flow of molten glass during subsequent operation of the glass manufacturing apparatus 10. To heat the delivery conduit 44, the ECU 510 of the control system 500 actuates the first power source P1 thereby indirectly heating the delivery conduit 44 with the resistive windings 90 by injecting electric current into the resistive windings 90. However, as noted herein, the thermally lossy construction of the delivery conduit 44 allows the delivery conduit 44 to readily dissipate thermal energy imparted to the delivery conduit 44 by the resistive windings 90 such that the delivery conduit is unable to reach its desired operational temperature (typically on the order from about 1150° C. to about 1350° C.) without additional thermal input.

Accordingly, in the embodiments described herein, the delivery conduit 44 is heated both indirectly with the resistive windings 90 and directly by injecting electric current through the delivery conduit 44 with a second power source P2 prior to flowing molten glass through the delivery conduit. That is, prior to flowing molten glass through the delivery conduit 44, the ECU 510 of the control system 500 actuates the second power source P2 thereby injecting electric current through the upstream electrode 72, the downstream electrode 70, and the delivery conduit 44 and resistively heating the delivery conduit 44 while simultaneously heating the delivery conduit 44 with the resistive windings 90. The combination of indirect heating with the resistive windings 90 and direct heating by injecting electric current through the refractory metal of the delivery conduit 44 significantly increases the heat flux into the delivery conduit 44, overcoming the thermal losses due to the lossy construction of the delivery conduit 44, and increasing the temperature of the delivery conduit 44. Specifically, indirect heating with the resistive windings 90 and direct heating by injecting electric current through the delivery conduit 44 results in an input heat flux into the delivery conduit 44 that is greater than an output heat flux away from the delivery conduit 44 prior to flowing molten glass through the delivery conduit, allowing the delivery conduit 44 to reach the desired operational temperature.

Once the delivery conduit 44 has reached its operational temperature, molten glass is directed through the glass manufacturing apparatus 10. Specifically, molten glass from the melting vessel 6 is permitted to flow from the melting vessel 6, through the first connecting tube 36 and into the fining vessel 38 where gas bubbles are removed from the molten glass. Thereafter, the molten glass is directed through the second connecting tube 40 and into the mixing vessel 42 where the molten glass is stirred to homogenize the melt. The homogenized molten glass is then directed through the delivery conduit 44 to the delivery vessel 46. The molten glass passes through the delivery vessel 46 and downcomer 48 and into the inlet of the forming apparatus 60, where the molten glass is formed into a glass ribbon 12.

As the molten glass begins to flow through the delivery conduit 44, the delivery conduit 44 is heated both indirectly with the resistive windings and directly by injecting electric current through the delivery conduit 44. Once a steady flow of molten glass through the delivery conduit 44 is established, the temperature of the delivery conduit 44 stabilizes and the injection of electric current through the delivery conduit 44 is discontinued such that the delivery conduit is only heated by the resistive windings 90. For example, in embodiments, the ECU 510 may actuate the second power source P2 to discontinue the injection of electric current into the delivery conduit 44 once the glass ribbon 12 is being drawn from the forming apparatus 60. In some other embodiments, the ECU 510 may actuate the second power source P2 to discontinue the injection of electric current into the delivery conduit 44 once the temperature of the delivery conduit 44 has reached a predetermined operational temperature with molten glass flowing through the delivery conduit 44 as may be determined, for example, with the thermocouple 80.

Thereafter, as molten glass flows through the delivery conduit 44 from the mixing vessel 42 to the delivery vessel 46, the delivery conduit 44 is indirectly heated with the resistive windings 90, which heating may be supplemented by intermittently injecting electric current through the delivery conduit 44, thereby directly heating the delivery conduit as molten glass flows through the delivery conduit 44. For example, the delivery conduit 44 may be intermittently directly heated by injecting electric current through the delivery conduit 44 when a temperature of the delivery conduit 44 decreases below a threshold temperature. Alternatively, the delivery conduit 44 may be intermittently directly heated by injecting electric current through the delivery conduit 44 when an electric current through the resistive windings 90 decreases below a threshold electric current value, indicating a potential failure and/or degradation of the resistive windings 90. In yet other embodiments, the delivery conduit 44 may be intermittently directly heated by injecting electric current through the delivery conduit 44 when a flow rate of the molten glass through the apparatus decreases below a baseline flow rate. In still other embodiments, the delivery conduit 44 may be intermittently directly heated by injecting electric current through the delivery conduit 44 to mitigate the continued formation of defects in the formed glass ribbon 12 when such defects are detected. It should be understood that various combinations of these techniques may also be employed in order to maintain the delivery conduit 44 at a desired operational temperature as molten For example, in one embodiment, a temperature of the delivery conduit is measured with the thermocouple 80 as molten glass flows through the delivery conduit 44. The thermocouple 80 provides the ECU 510 with an electronic signal indicative of the temperature of the delivery conduit 44. The ECU 510 compares the temperature of the delivery conduit 44 with a threshold temperature stored in memory and, when the temperature of the delivery conduit 44 is less than the threshold temperature, the ECU 510 actuates the second power source P2 to inject electric current into the delivery conduit 44, thereby directly heating the delivery conduit 44. The injection of electric current and direct heating of the delivery conduit 44 may continue until the temperature of the delivery conduit 44 is increased above the threshold temperature as determined by the ECU 510 based on signals received from the thermocouple 80 indicative of the temperature of the delivery conduit 44. In this embodiment, a decrease in the temperature of the delivery conduit 44 may be indicative of the degradation or failure of the resistive windings 90 and/or the degradation or failure of another component of the glass manufacturing apparatus 10 upstream of the delivery conduit 44 including, without limitation, the melting vessel 15.

Additionally or alternatively, the current flowing through the resistive windings 90 may be measured with, for example, ammeter AM as molten glass flows through the delivery conduit 44. The ammeter AM provides the ECU 510 with an electronic signal indicative of the electric current flowing through the resistive windings 90 which, in turn, is indicative of the amount of heat energy being imparted to the delivery conduit 44. The ECU 510 compares the amount of electric current flowing through the delivery conduit 44 with a threshold electric current value stored in memory and, when the amount of electric current flowing through the delivery conduit 44 is less than the threshold electric current value, the ECU 510 actuates the second power source P2 to inject additional electric current (i.e., increase the electric current) into the delivery conduit 44, thereby directly heating the delivery conduit 44. In this embodiment, a decrease in the amount of electric current flowing through the resistive windings 90 may be indicative of the degradation or failure of the resistive windings 90 and/or the degradation or failure of the first power source P1, indicating a need to supplement the indirect heat provided by the resistive windings 90 with direct heating by injecting electric current into the delivery conduit 44. The injection of electric current and direct heating of the delivery conduit 44 may continue until the amount of electric current flowing through the resistive windings 90 is restored (such as, for example, by replacing or repairing the resistive windings and or the first power source P1) as determined by the ECU 510 based on signals received from the ammeter AM indicative of the amount of electric current flowing through the resistive windings 90.

Additionally or alternatively, the glass ribbon 12 formed with the forming apparatus 60 may be passed through a flaw detection system 84 after the glass ribbon 12 has cooled and solidified. The flaw detection system 84 automatically detects the presence of flaws in the glass ribbon and provides the ECU 510 with an electronic signal indicative of the presence of flaws in the glass ribbon 12. In embodiments, the presence of flaws in the formed glass ribbon may be attributable to the temperature of the glass and, more specifically, the presence of flaws in the formed glass ribbon may be mitigated by increasing the temperature of the molten glass. Accordingly, in embodiments, the ECU 510 actuates the second power source P2 to inject electric current into the delivery conduit 44, thereby directly heating the delivery conduit 44 and increasing the temperature of the molten glass flowing through the delivery conduit 44. The increase in the temperature of the molten glass provides additional thermal energy which aids in homogenizing the molten glass by mitigating the formation of defects such as gas bubbles, voids, cord, striations and the like.

Additionally or alternatively, a flow rate of the molten glass through the glass manufacturing apparatus may be determined with a flow rate monitor 82. The flow rate monitor 82 provides the ECU 510 with an electronic signal indicative of the rate (lbs/min or kgs/min) at which molten glass is flowing through the glass manufacturing apparatus 10. The ECU 510 compares the flow rate of molten glass through the delivery conduit 44 with a baseline flow rate stored in memory and, when the flow rate of molten glass through the delivery conduit 44 is less than the baseline flow, the ECU 510 actuates the second power source to inject electric current into the delivery conduit 44, thereby directly heating the delivery conduit 44. The injection of electric current into the delivery conduit 44 increases the flow rate of the molten glass through the glass manufacturing apparatus 10 by decreasing the viscosity of the molten glass, thereby allowing more glass to flow through the apparatus per unit of time. The injection of electric current and direct heating of the delivery conduit 44 may continue until the flow rate of molten glass through the delivery conduit 44 is increased above the baseline flow rate as determined by the ECU 510 based on signals received from the flow rate monitor 82 indicative of the flow rate of molten glass through the delivery conduit 44.

While various embodiments of intermittently heating delivery conduit 44 have been described herein, it should be understood that each of these embodiments may be used in conjunction with one or more of the other embodiments for intermittently heating the delivery conduit 44 described herein.

It should now be understood that the embodiments described herein relate to glass manufacturing apparatuses and methods for heating portions of the glass manufacturing apparatuses during initial start-up of the glass manufacturing apparatuses and thereafter, such as during operation of the glass manufacturing apparatuses. The methods and apparatuses described herein are particularly well suited for facilitating the initial start-up of glass manufacturing apparatuses as the combination of indirect and direct heating of portions of the glass manufacturing apparatuses, such as the delivery conduit, is effective for overcoming thermal losses intentionally designed into the delivery conduit to facilitate temperature control during steady state operation of the glass manufacturing apparatuses. In addition, the apparatuses described herein may also be used to control the temperature of molten glass flowing through the glass manufacturing apparatus and, as a result, may be used to address equipment malfunctions, the occurrence of defects in the final glass product, and the like.

While specific reference has been made herein to forming glass ribbons, it should be understood that the methods and apparatuses described herein may be used in the formation of other glass articles with other form factors including, without limitation, glass tubing or the like.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for operating a glass manufacturing apparatus, the method comprising:
   heating a delivery conduit with resistive windings positioned around an exterior surface of the delivery conduit by supplying electric current to the resistive windings, the delivery conduit extending between a mixing vessel and a delivery vessel; and
   injecting electric current through the delivery conduit while heating the delivery conduit with the resistive windings and prior to flowing molten glass through the delivery conduit thereby increasing a temperature of the of the delivery conduit,
   wherein an input heat flux into the delivery conduit is greater than an output heat flux away from the delivery conduit prior to flowing molten glass through the delivery conduit.

2. The method of claim 1, further comprising:
   flowing molten glass from the mixing vessel to the delivery vessel through the delivery conduit;
   heating the delivery conduit with the resistive windings as the molten glass flows through the delivery conduit; and
   discontinuing the injection of electric current through the delivery conduit as the molten glass flows through the delivery conduit.

3. The method of claim 1, further comprising:
   flowing molten glass from the mixing vessel to the delivery vessel through the delivery conduit;
   heating the delivery conduit with the resistive windings as the molten glass flows through the delivery conduit; and
   intermittently injecting electric current through the delivery conduit as the molten glass flows through the delivery conduit.

4. The method of claim 3, further comprising:
   measuring a temperature of the delivery conduit as molten glass flows through the delivery conduit; and
   injecting electric current through the delivery conduit when a temperature of the delivery conduit is less than a threshold temperature.

5. The method of claim 3, further comprising:
   monitoring a flow rate of molten glass through the glass manufacturing apparatus; and injecting electric current through the delivery conduit when the flow rate of molten glass through the glass manufacturing apparatus is less than a baseline flow rate.

6. The method of claim 3, further comprising:
forming the molten glass into a glass ribbon with the glass manufacturing apparatus;
detecting, automatically with a flaw detection system, flaws in the glass ribbon; and
injecting electric current through the delivery conduit when flaws are detected in the glass ribbon with the flaw detection system.

7. The method of claim 3 further comprising:
monitoring electric current passing through the resistive windings; and
increasing the electric current through the delivery conduit when the electric current is less than a threshold electric current value.

8. The method of claim 1, wherein:
the delivery vessel comprises a downstream electrode electrically coupled to the delivery conduit; and
the mixing vessel comprises an upstream electrode electrically coupled to the delivery conduit, wherein the upstream electrode, the delivery conduit, and the downstream electrode are electrically coupled in a closed-loop circuit.

9. The method of claim 8, wherein electric current is injected into the closed-loop circuit through the downstream electrode.

10. The method of claim 1, wherein the delivery vessel is fluidly coupled to a forming vessel.

11. A glass manufacturing apparatus comprising:
a mixing vessel comprising an upstream electrode;
a delivery vessel comprising a downstream electrode;
a delivery conduit connecting the mixing vessel to the delivery vessel, the delivery conduit comprising resistive windings positioned around exterior surface of the delivery conduit;
a first power source electrically coupled to the resistive windings;
a second power source electrically coupled to the downstream electrode of the delivery vessel, the upstream electrode of the mixing vessel, and the delivery conduit in a closed-loop circuit;
a flow rate monitor detecting a flow rate of molten glass through the glass manufacturing apparatus;
an electronic control unit communicatively coupled to the first power source, the second power source, and the flow rate monitor and comprising a processor and a non-transient memory storing a computer readable and executable instruction set which, when executed by the processor:
actuates the first power source thereby heating the delivery conduit with the resistive windings by supplying electric current to the resistive windings;
determines the flow rate of molten glass through the glass manufacturing apparatus with the flow rate monitor; and
when the flow rate of molten glass through the glass manufacturing apparatus is less than a baseline flow rate and prior to flowing molten glass through the delivery conduit as determined with the flow rate monitor, actuates the second power source thereby injecting electric current through the delivery conduit while heating the delivery conduit with the resistive windings and increasing a temperature of the delivery conduit such that an input heat flux into the delivery conduit is greater than an output heat flux away from the delivery conduit.

12. The glass manufacturing apparatus of claim 11, wherein the computer readable and executable instruction set, when executed by the processor, intermittently actuates the second power source thereby intermittently injecting electric current through the delivery conduit as the molten glass flows through the delivery conduit.

13. The glass manufacturing apparatus of claim 11 further comprising at least one thermocouple operatively associated with the delivery conduit and communicatively coupled to the electronic control unit, the at least one thermocouple positioned to detect a temperature of the delivery conduit, wherein the computer readable and executable instruction set, when executed by the processor, actuates the second power source thereby injecting electric current through the delivery conduit when a temperature of the delivery conduit is less than a threshold temperature.

14. The glass manufacturing apparatus of claim 11 further comprising a flaw detection system communicatively coupled to the electronic control unit, the flaw detection system detecting flaws in a glass ribbon formed with the glass manufacturing apparatus, wherein the computer readable and executable instruction set, when executed by the processor, actuates the second power source thereby injecting electric current through the delivery conduit when flaws are detected in the glass ribbon with the flaw detection system.

15. The glass manufacturing apparatus of claim 11 further comprising at least one ammeter electrically coupled to the resistive windings and communicatively coupled to the electronic control unit, the ammeter detecting electric current passing through the resistive windings, wherein the computer readable and executable instruction set, when executed by the processor, actuates the second power source thereby injecting electric current through the delivery conduit when electric current through the resistive windings is less than a threshold electric current value.

16. The glass manufacturing apparatus of claim 11, wherein the delivery vessel is fluidly coupled to a fusion-forming vessel.

17. The glass manufacturing apparatus of claim 11, wherein electric current is injected into the closed-loop circuit through the downstream electrode.

* * * * *